Dec. 23, 1969 K. GROVES ET AL 3,486,117

RADIO TELEGRAPH SIGNAL TRANSMISSION

Filed Jan. 23, 1967 2 Sheets-Sheet 1

KENNETH GROVES,
PHILIP N. RIDOUT,
INVENTORS

BY Hall & Houghton

ATTORNEY

RADIO TELEGRAPH SIGNAL TRANSMISSION

Filed Jan. 23, 1967 2 Sheets-Sheet 2

KENNETH GROVES
PHILIP N. RIDOUT,
INVENTORS

BY [signature]
ATTORNEY 3,486,117
RADIO TELEGRAPH SIGNAL TRANSMISSION

Kenneth Groves, Kenton, and Philip Neale Ridout, Elstree, England, assignors to Her Majesty's Postmaster General of the General Post Office, London, England Filed Jan. 23, 1967, Ser. No. 610,975
Claims priority, application Great Britain, Feb. 2, 1966, 4,596/66
Int. Cl. H04b *1/66*
U.S. Cl. 325—30 5 Claims

ABSTRACT OF THE DISCLOSURE

Amplitude modulation of radio telegraph signal, which frequency modulates carrier, so that second order sidebands will be received after transmission and filtering with the same amplitude they possessed before transmission so that error rate will be decreased.

Figure 1:
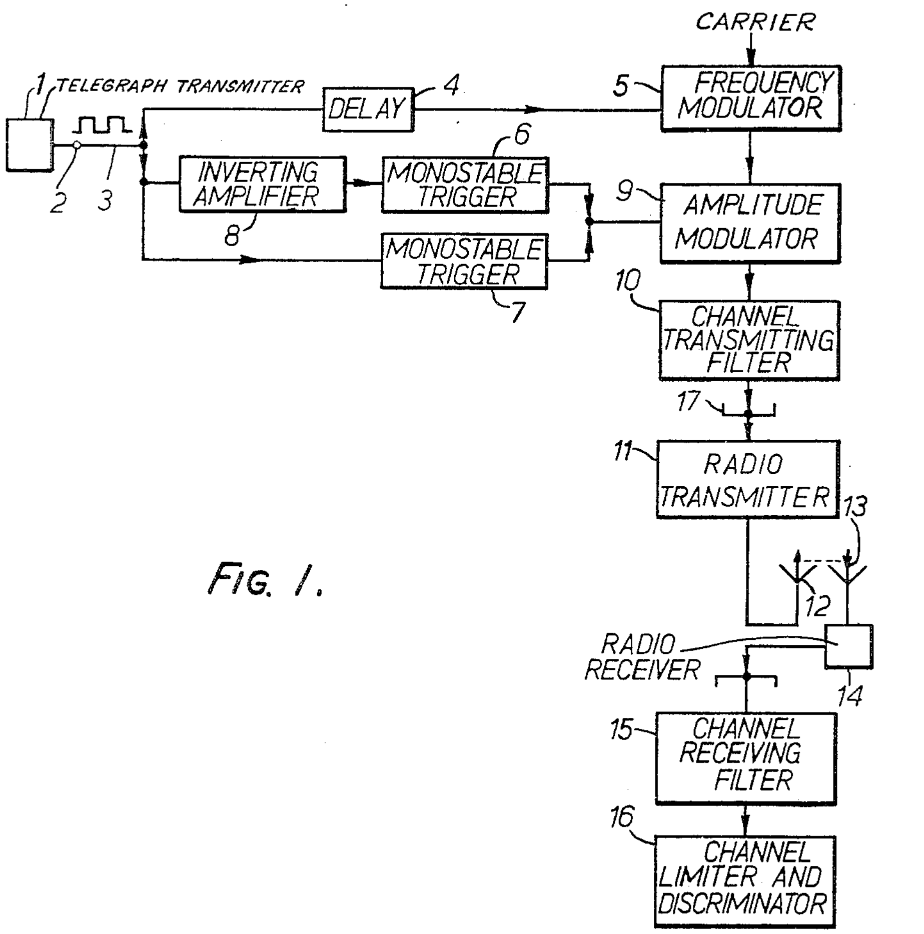

This invention relates to radio telegraph signal transmission, and particularly to narrow-band systems, employing frequency modulation.

Experience has shown that when a narrow band, frequency-modulated radio telegraph link is operated under multipath transmission conditions (under which selective fading can occur), an unacceptable element-error rate can result even though the signal to noise ratio is large. The magnitude of the effect is greater than could be explained by the effect of selective fading on an ideal F.M. signal.

As is well known, an angle-modulated carrier has an infinite set of side-bands, the amplitude of a side band of order $n$ being the $n$th order Bessel function of the modulation index. The resultant of each even-order sideband pair is in phase with the carrier, and the resultant of each odd-order pair is in quadrature with the carrier. In narrow-band F.M. radio telegraph systems the modulation index is small and in consequence the amplitudes of high-order sidebands are negligible but the amplitudes of lower order sidebands, and particularly those of the first and second order sidebands, are not negligible. Alteration of the relative amplitudes of the sidebands of different orders results in the introduction of some amplitude modulation. The present invention is based on the discovery that, in commonly used multi-channel F.M. radio telegraph systems, the transmitting and receiving channel filters cause sufficient attenuation of the second and higher order sidebands, relative to the first order sidebands, to introduce a measure of amplitude modulation which is sufficient to give rise to an unacceptable element-error rate under conditions of selective fading, and that the error rate can be considerably reduced if the amplitude of the second order sidebands at the output of the receiving filter, in a reversal signal at the nominal modulation rate, is substantially correct. A reversals signal is a telegraph signal which alternates continuously from mark to space, such as a succession of dots in Morse code.

According to the present invention, a method of radio telegraph signal transmission includes the steps of frequency modulating a carrier signal by telegraph signals and amplitude modulating the carrier signal according to transitions of the telegraph signals to produce a signal for transmission such that when using a reversals telegraph signal at the nominal modulation rate the transmission signal has a second order sideband level the amplitude of which relative to the amplitude of the carrier signal frequency component in the transmission signal is greater than that due to the frequency modulation of the carrier signal. The level of amplitude modulation is chosen such that after passage of the transmission signal over channel filters in the transmitter and receiver equipment, the second order sideband level when using a reversals signal at the nominal modulation rate is about equal to that due to the frequency modulation of the carrier signal, the error rate then being considerably reduced. Use of this degree of amplitude modulation has also been found to reduce the error rate at lower modulation rates and also when employing random telegraph signals.

Radio telegraph transmission terminal equipment, operable to generate a modulated carrier according to the method of the invention, includes a telegraph signal input path and a carrier signal source, means operable to generate modulating signals in response to transitions of the telegraph signals and including a pair of single-pulse generating devices (e.g. monostable trigger devices) so connected to the input signal path that telegraph signals are applied in antiphase to the inputs of the single pulse generating devices and modulating means for producing a modulated carrier signal modulated in frequency by telegraph signals on the signal input path and amplitude modulated by the outputs of the two single-pulse generating devices such that, when using a reversals telegraph signal at the nominal modulation rate, the second order sideband amplitude level in the transmission signal relative to the carrier signal amplitude is greater than that due to the frequency modulation of the carrier signal.

The modulation of the carrier signal in accordance with the invention can be carried out in several ways. For example, the carrier signal can be modulated in frequency by the telegraph signals and the whole frequency modulated carrier signal then modulated in amplitude according to telegraph signal transitions; conversely the carrier signal can be amplitude modulated in accordance with telegraph signal transitions and then modulated in frequency by the telegraph signals. Alternatively, a frequency modulated carrier signal is added to an amplitude modulated carrier signal. In each case there is an increase in second order sideband level relative to the carrier signal level, but the first two methods are less suitable when a large enhancement of the second order sidebands is required. The degree or depth of amplitude modulation necessary to secure a useful improvement in error rate varies in the same sense as the speed of signalling and inversely with the bandwidth of the channel filters in the transmitter and receiver equipments; and if a high signalling speed with narrow filter bandwidth is required, the third method may be preferable. However, it is technically simpler to provide apparatus to carry out the first and second methods and to adjust the signalling speed in relation to the channel filter bandwidth so that a reasonable depth of the amplitude modulation secures the desired improvement in error rate.

Figure 3:
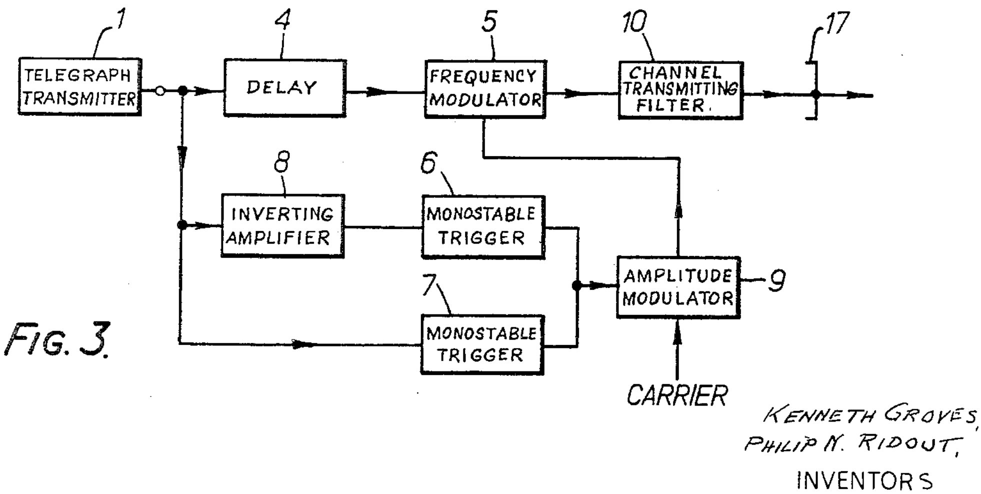
Figure 2:
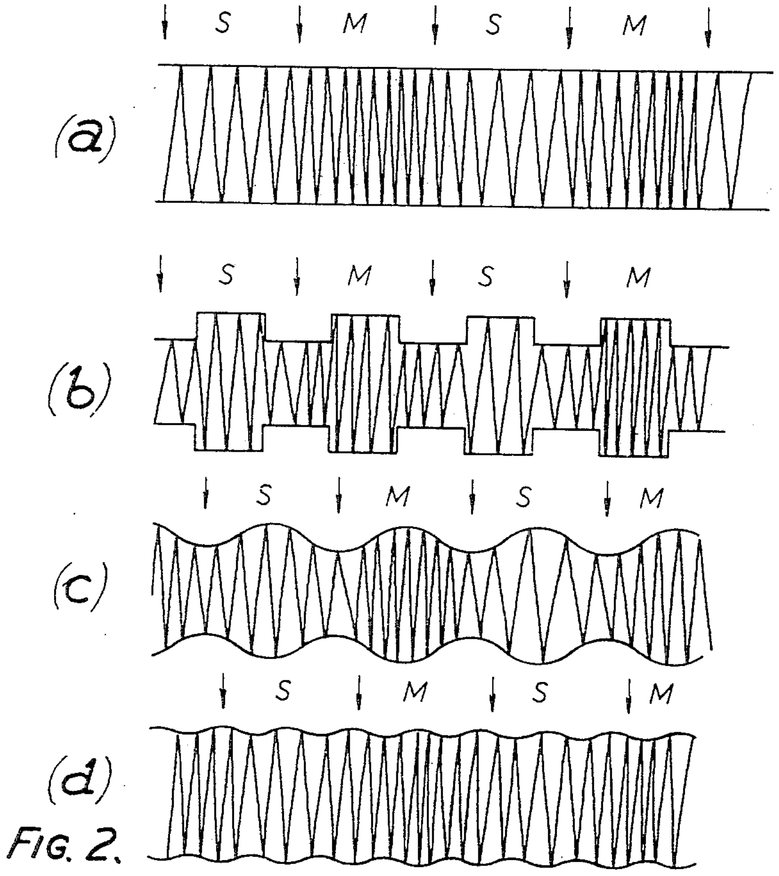
Figure 4:
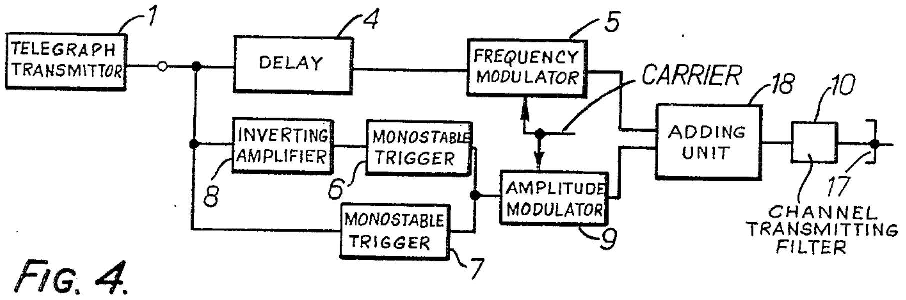

By way of example, the invention will be described in greater detail with reference to the accompanying drawings, in which:

FIG. 1 illustrates, schematically, components of a radio telegraph link necessary for explanation of the invention, FIG. 2 shows waveforms associated with the link illustrated in FIG. 1, and FIGS. 3 and 4 show, schematically, alternative transmitter equipments to that shown in FIG. 1.

The radio telegraph link shown in FIG. 1 has transmission terminal equipment operable to modulate the carrier signal of a transmission channel carrier in accordance with the invention, by modulating the channel carrier signal in frequency by the telegraph signals and then amplitude modulating the whole frequency modulated carrier in accordance with transitions of the telegraph signals thereby to produce a signal for transmission.

In the link shown in FIG. 1, a telegraph transmitter 1 is connected via an input terminal 2 to an incoming telegraph signal path 3 of the transmission equipment. The telegraph signals on the incoming path are in the form of substantially rectangular pulses.

The input path 3 is connected via a transmission delay device 4 (having a delay equal to one quarter of the duration of a telegraph signal element) as an input to a frequency modulator 5, which receives as another input the channel carrier signal. The input path 3 is also connected to control two monostable trigger devices 6 and 7, the connection to the former being made via an inverting amplifier 8 whilst the connection to the latter is direct. The outputs of the trigger devices 6 and 7 are fed as a common modulating input to an amplitude modulator 9 to modulate the frequency modulated carrier from the modulator 5 which is applied to the modulator 9. The output from the modulator 9 passes via a channel transmitter filter 10 to a radio transmitter 11 and thence to a transmitting aerial 12.

At the other end of the link, there is a receiving aerial 13 connected to the input of a radio receiver 14 an output from which passes via a channel receiving filter 15 to a channel limiter and discriminator 16, forming part of the channel receiving apparatus.

In the following description of the manner of operation of the link shown in FIG. 1, it will be assumed that the telegraph signals on the incoming signal path 3 are reversals signals at the nominal modulation rate. The second-order sidebands at lower modulation rates will, of course, not be attenuated appreciably in transmission but the modulation index relating to such lower modulating frequencies is increased in inverse ratio, and the importance of the higher-order sidebands increases correspondingly and harmonics of the fundamental modulation frequency further complicate the situation as the modulation rate is lowered. It has been found that the significant spectrum components of the modulated signals occur at approximately the same frequencies, regardless of the modulation rate, and that if the second-order sidebands with reversals at the nominal modulation rate are received correctly at the output of the receiver filter 15, then a similar degree of amplitude modulation of a carrier signal frequency modulation at lower modulation rates, and hence also one modulated by random telegraph signals at the nominal modulation rate, will also be substantially free from amplitude modulation as the output of filter 15.

Telegraph signals on the incoming path 3, after delay by the delay device 4, modulate the frequency of the carrier by modulator 5, the output of which is a carrier signal modulated in frequency by the incoming telegraph signals. The trigger devices 6 and 7 each has a relaxation time of one half the duration of a telegraph signal element and are operated by telegraph signals on incoming path 3, to generate modulating signals of half-element duration for transitions of the telegraph signals, the use of direct and inverted inputs to the trigger devices ensuring that amplitude changes are effected equally during mark-to-space and space-to-mark transitions. The delay device 4 ensures that the mean frequency modulation has the correct phase relationship with the amplitude modulation.

The frequency modulated carrier signal from the modulator 5 to the modulator 9 is modulated in amplitude by the modulating pulses fed to the modulator by the trigger devices 6 and 7 to produce a signal for transmission, the frequency modulated signal level being modulated by modulator 9 so that it is reduced in amplitude during transitions of the telegraph signals from space-to-mark and mark-to-space. The depth of amplitude modulation is adjusted such that when using a reversals telegraph signal at the nominal modulation rate, following passage of the output of modulator 9 via filter 10, transmission over the radio link and reception by the receiver 14, the modulated carrier at the output of receiving filter 15 is substantially free from amplitude modulation, with the carrier, first and second order sidebands having their correct relative amplitudes. The amplitude modulation introduced due to use of the trigger devices 6 and 7 results in over-emphasis of the second order sidebands, when using telegraph signals as mentioned above, and by correct choice of the depth of amplitude modulation under these conditions the attenuation characteristics of the transmitting and receiving filters can be compensated as regards reversals signals at the nominal or lower modulation rates and also as regards random signals.

In FIG. 2 there are shown waveforms explanatory of the operation of the system shown in FIG. 1. For simplicity, a reversals telegraph signal at the nominal modulation rate has been shown although the system will operate satisfactorily at lower modulation rates as well as with random signals.

FIG. 2(*a*) shows the output from the frequency modulator 5, with a higher frequency for a Mark than a Space, FIG. 2(*b*) shows the output from the amplitude modulator 9 carrying rectangular amplitude modulations. FIG. 2(*c*) shows the output from the transmitting filter 10, carrying substantially sinusoidal amplitude modulation, with both frequency and amplitude modulations displaced in time due to the relay of the transmitting filter. FIG. 2(*d*) shows the output of the receiving filter 15 (with single path non-fading conditions) which is substantially free of amplitude modulation.

Telegraph transmitter apparatus of the kind described (i.e. components 1–10) may form part of a multi-channel telegraph transmitter terminal equipment, and the "commoning" symbol 17 indicates that other similar apparatus may be associated with the radio transmitter 11.

Tests have been made in which telegraph signals were transmitted with equal mean amplitudes over two radio transmission paths, subject to independent fading, and having a transmission delay difference of 2 ms. The transmitting and receiving channel filter bandwidths were 170 c./s. and 85 c./s. respectively and the signalling speed was 80 bauds. The error rate was determined for a conventional system and for a system utilising modulating equipment as shown in FIG. 1 using an amplitude modulation depth of 50%, this being the optimum for the signalling speed and filter bandwidths chosen. In both cases single-aerial and dual-diversity reception were tested. In the dual diversity tests the combining unit was one in which the inferior signal is completely suppressed. The following table shows the error rate in parts of 10,000 for reversals and for random modulation.

| | Normal system | | System according to the invention | |
|---|---|---|---|---|
| Signal | Single aerial | Dual diversity | Single aerial | Dual diversity |
| Reversals | 123 | 12 | 8 | 0.2 |
| Random | 53 | 5 | 5 | 0.1 |

Error rate in parts per 10,000

In the above described embodiments, reference has been made to the use of a pair of monostable trigger devices (one responsive to mark-to-space transitions of the telegraph signal and the other responsive to space-to-mark transitions). However, a single device responsive to both transition directions to produce suitable modulating output pulses could be used in place of the two monostable trigger devices.

In FIG. 3 there is shown an alternative arrangement of the transmitter equipment illustrated in FIG. 1. In FIG. 3, the monostable trigger devices 6 and 7 modulate the amplitude of a channel carrier signal fed to the modulator 9, the amplitude modulated output of that modulator being fed to the frequency modulator 5 and modulated in frequency by telegraph signals from the delay device 4.

In FIG. 4, the monostable trigger devices 6 and 7 modulate the amplitude of a channel carrier signal fed to the modulator 9 and the outputs of the modulator 9 and of the frequency modulator 5 are fed as separate inputs to a signal adding unit 18, the output of which is a frequency modulated carrier, modulated in amplitude.

Both FIGS. 3 and 4 operate to produce an output from the transmitting channel filter 10 having a waveform as shown in FIG. 2*c*.

We claim:

1. Radio telegraph transmission terminal equipment including a telegraph signal input path, modulating means including means for generating a signal at a carrier signal frequency, means connecting said input path to said modulating means to apply telegraph signals thereto as a frequency modulating input, single-pulse generating means operable to generate modulating signals in response to transitions of telegraph signals on said input path, means which includes a delay device providing a transmission delay equal to one quarter the duration of a telegraph signal element on the said input path connecting the said signal input path to said single-pulse generating means to apply telegraph signals thereto whereby identical single output pulses are generated by said generating means in response to each transition of said telegraph signals, means connecting said generating means to said modulating means to apply said modulating signals thereto as an amplitude modulating input, whereby the said modulating means generates a transmission signal comprising a said carrier signal modulated in frequency by said telegraph signals and in amplitude by said modulating signal output from said single-pulse generating devices such that in response to a reversals telegraph signal at a predetermined nominal modulation rate, the said transmission signal has a second order sideband amplitude level greater than that due to the said frequency modulation of the said carrier signal.

2. Terminal equipment as claimed in claim 1, wherein the said single-pulse generating means comprises a pair of monostable trigger devices and means connecting said signal input path to said trigger devices to apply telegraph signals to one of said trigger devices in antiphase with telegraph signals applied to the other said trigger device.

3. Terminal equipment as claimed in claim 2, wherein said modulating means includes a variable frequency oscillator having a natural frequency equal to said carrier signal frequency, amplitude modulation means, means connecting said signal input path to said oscillator for modulating said carrier signal frequency, means connecting said oscillator to said amplitude modulation means to apply a frequency modulated signal thereto, and means connecting the said single-pulse generating means to said amplitude modulation means to apply said modulating signals thereto to amplitude modulate said frequency modulated carrier signal and thereby produce said transmission signal.

4. Terminal equipment according to claim 3, wherein said monostable trigger devices each is operable to generate pulses having a duration equal to one half the duration of a said telegraph signal element.

5. Terminal equipment according to claim 4, wherein said modulating means includes an amplitude modulating device, a frequency modulating device, and a signal adding device, wherein said telegraph signal input path and said carrier frequency signal source are connected to apply signals to said frequency modulating device to generate a carrier signal modulated in frequency by said telegraph signals, wherein said monostable trigger devices and said carrier signal frequency source are connected to said amplitude modulating device to generate a carrier signal modulated in amplitude by said modulating signals produced by said monostable trigger devices, and means for adding said frequency modulated carrier signal and said amplitude modulated signal to produce said transmission signal.

References Cited

UNITED STATES PATENTS

| | | | |
|---|---|---|---|
| 1,999,176 | 4/1935 | Albersheim | 325—147 |
| 2,179,182 | 11/1939 | Hansell | 332—18 |
| 2,278,779 | 4/1942 | Hansell | 325—65 |
| 2,362,201 | 11/1944 | Hathaway | 325—46 |
| 3,051,902 | 8/1962 | Ross | 325—40 |
| 3,213,368 | 10/1965 | Geluk | 325—147 |
| 3,348,151 | 10/1967 | Holmes | 325—182 |

KATHLEEN H. CLAFFY, Primary Examiner

A. B. KIMBALL, Jr., Assistant Examiner

U.S. Cl. X.R.

178—66; 325—40, 42, 61, 65, 139, 163; 332—17, 18